US010659611B1

(12) United States Patent
Jangale et al.

(10) Patent No.: US 10,659,611 B1
(45) Date of Patent: May 19, 2020

(54) SYSTEM AND METHOD FOR IMPROVED AUTOMATIC CALLBACKS IN A CONTACT CENTER

(71) Applicant: Avaya Inc., Santa Clara, CA (US)

(72) Inventors: Prashant Jangale, Pune (IN); Prashant Jawale, Pune (IN); Umesh Mahajan, Pune (IN)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 16/248,647

(22) Filed: Jan. 15, 2019

(51) Int. Cl.
*H04M 3/523* (2006.01)
*H04M 3/51* (2006.01)

(52) U.S. Cl.
CPC ....... *H04M 3/5231* (2013.01); *H04M 3/5175* (2013.01)

(58) Field of Classification Search
CPC .................. H04M 3/5231; H04M 3/5175
See application file for complete search history.

(56) References Cited

U.S. PATENT DOCUMENTS

| 9,172,798 | B1* | 10/2015 | Ouimette | H04M 3/42357 |
| 10,135,978 | B1* | 11/2018 | Koster | H04M 3/5158 |
| 2015/0074170 | A1* | 3/2015 | Steiner | G06Q 10/06 |
| | | | | 709/202 |

* cited by examiner

*Primary Examiner* — Nafiz E Hoque
(74) *Attorney, Agent, or Firm* — Sheridan Ross P.C.

(57) ABSTRACT

A callback window for initiating an electronic communication session with a customer communication endpoint is received. A request from an agent communication endpoint is received to not handle any electronic communication sessions during a time period. For example, a contact center agent may want to take a lunch break. A determination is made that the callback window (or a portion of the callback window) is within the time period. In response to determining the callback window is within the time period, the system may take various steps, such as, automatically denying the request, automatically adjusting the time period, and sending various messages to the agent communication endpoint to identify ways to handle the communication session.

20 Claims, 5 Drawing Sheets

SYSTEM AND METHOD FOR IMPROVED AUTOMATIC CALLBACKS IN A CONTACT CENTER

BACKGROUND

In an outbound contact center, a contact center agent/customer interaction may result in the customer requesting a callback at a preferred window (e.g., a video conference callback next Thursday @ 1:00 P.M). In such cases, the requested callback window is stored by an autodialer that automatically dials the customer within the callback window so that the customer and the same contact center can continue their conversation. Since the customer has provided the preferred time, it becomes important to connect to the customer during the preferred callback window. However, the preferred callback window may coincide with other events of the contact center agent. For example, the contact center agent may have an upcoming meeting during the preferred callback window. This may result in the callback not being made within the preferred callback window.

SUMMARY

These and other needs are addressed by the various embodiments and configurations of the present disclosure. A callback window for initiating an electronic communication session with a customer communication endpoint is received. A request from an agent communication endpoint is received to not handle any electronic communication sessions during a time period. For example, a contact center agent may want to take a lunch break. A determination is made that the callback window (or a portion of the callback window) is within the time period. In response to determining the callback window is within the time period, the system may take various steps, such as, automatically denying the request, automatically adjusting the time period, sending a first message to an agent communication endpoint that allows a first contact center agent to adjust the time period so that the callback window is not within the time period, sending a second message to the agent communication endpoint that identifies the callback window and a customer associated with the callback window, sending a third message to the agent communication endpoint that allows the first contact center agent to associate the callback widow with a second contact center agent, and/or sending a fourth message to the customer communication endpoint to reschedule the callback window.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
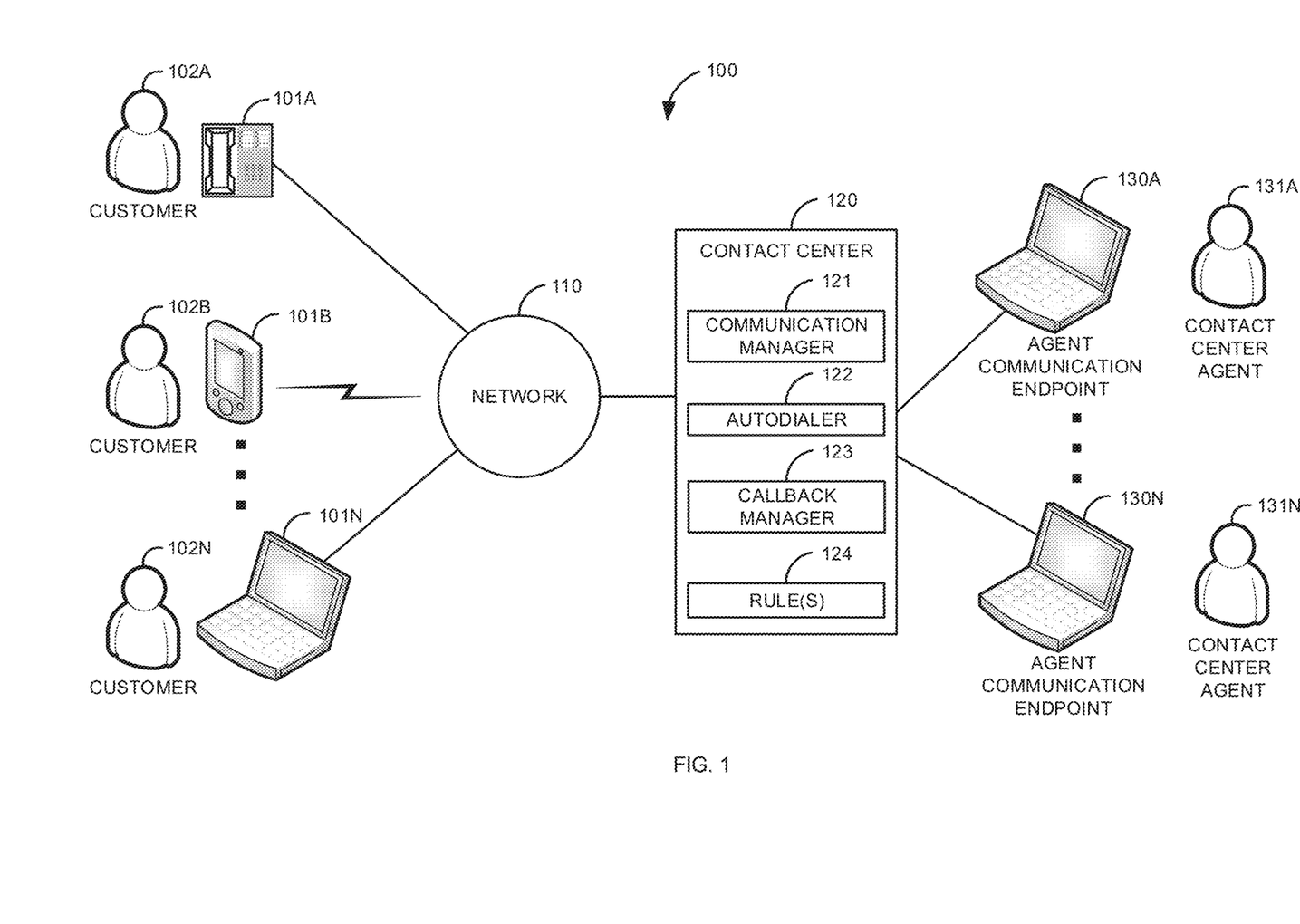
FIG. 1 is a block diagram of a first illustrative system for improved automatic callbacks in a contact center.

FIG. 1 is a block diagram of a first illustrative system 100 for improved automatic callbacks in a contact center 120. The first illustrative system 100 comprises customer communication endpoints 101A-101N, a network 110, a contact center 120, and agent communication endpoints 130A-130N. In addition, customers 102A-102N and contact center agents 131A-131N are shown for convenience.

The customer communication endpoints 101A-101N can be or may include any user communication endpoint device that can communicate on the network 110, such as a Personal Computer (PC), a telephone, a video system, a cellular telephone, a Personal Digital Assistant (PDA), a tablet device, a notebook device, a smartphone, and/or the like. The customer communication endpoints 101A-101N are devices where a communication session ends. The customer communication endpoints 101A-101N are not network elements that facilitate and/or relay a communication session in the network 110, such as a communication manager 121 or router. As shown in FIG. 1, any number of customer communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging protocols, and/or the like. Thus, the network 110 is an electronic communication network configured to carry messages via packets and/or circuit switched communications.

The contact center 120 can be or may include any contact center 120 that can manage communication sessions to and/or from the customer communication endpoints 101A-101N. The contact center 120 can manage various types of communication sessions, such as, voice communication sessions, video communication sessions, virtual reality communication sessions, multimedia communication sessions, Instant Messaging (IM) communication sessions, email communication sessions, test messaging communication sessions, and/or the like. The contact center 120 further comprises a communication manager 121, an autodialer 122, a callback manager 123, and rule(s) 124. Although not shown, the contact center 120 may comprise other elements, such as, a contact center queue, a web server, an Interactive Voice Response (IVR) system, and/or the like.

The communication manager 121 can be or may include any hardware coupled with firmware/software that can route various communication sessions in the contact center 120, such as a Private Branch Exchange (PBX), a switch, a proxy server, a session manager, and/or the like.

The autodialer 122 can be or may include any hardware coupled with software that can automatically dial/establish an outbound communication session between a customer communication endpoint 101 and an agent communication endpoint 130.

The callback manager 123 can be or may include any firmware/software that can manage callbacks in the contact center 120. For example, the callback manager 123 may manage how the autodialer 122 initiates communication sessions from the contact center 120.

The rule(s) 124 can be or may include any rule(s) 124 that allow the callback manager 123 to manage callbacks in the contact center 120. The rule(s) 124 may be administrated by an administrator and/or may be predefined rules 124.

The agent communication endpoints 130A-130N can be or may include any user communication device, such as the customer communication endpoints 101A-101N, and/or the like. The agent communication endpoints 130A-130N can comprise multiple agent communication endpoints 101, such as a telephone and a personal computer.

Figure 2:
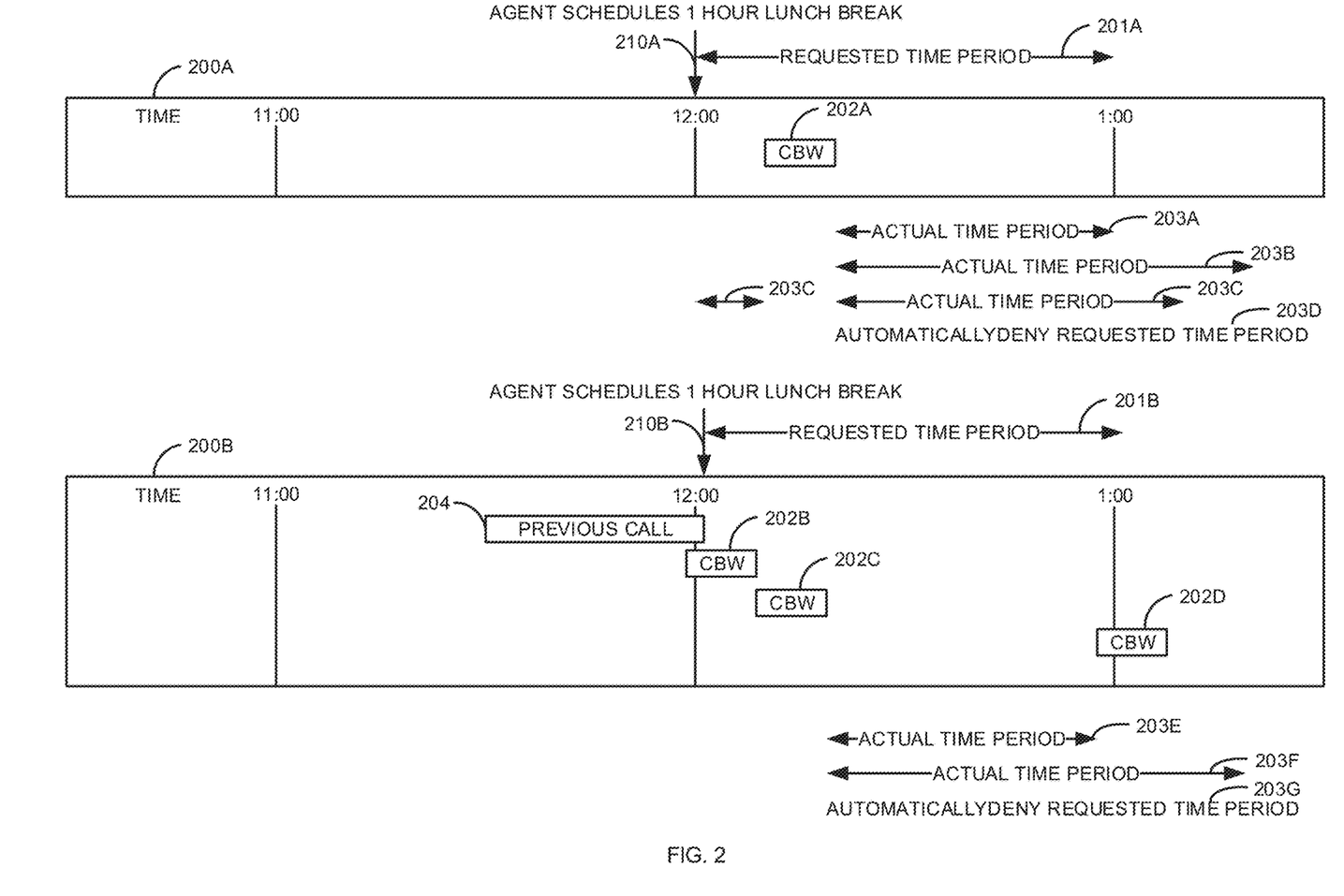
FIG. 2 is a diagram that illustrates management of callback windows in a contact center.

FIG. 2 is a diagram that illustrates management of callback windows 202 in a contact center 120. Illustratively, the customer communication endpoints 101A-101N, the contact center 120, the communication manager 121, the autodialer 122, the callback manager 123, the rules 124, and the agent communication endpoints 130A-130N are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The diagram of FIG. 2 comprises agent schedules 200A-200B, requested time periods 201A-201B, callback windows 202A-202D, actual time periods 203A-203G, and a previous call 204. The agent schedules 200A-200B are agent schedules 200A-200B of a contact center agent 131. In this exemplary embodiment, the agent schedules 200A-200B illustratively show a portion of the contact center agent's calendar. The agent schedule 200A contains the callback window 202A. The callback window 202A is from 12:10 to 12:20 in the agent schedule 200A. A callback window 200 is a time period where the customer 102 is expecting to be called back. The callback window 202 can be for any defined period of time or for a specific time (e.g., 12:00 noon on Thursday May 11, 2018).

The contact center agent 131 has requested to not handle any communication sessions in step 210A. In this example, the contact center agent 131 has requested to take a one hour lunch break (requested time period 201A). The contact center agent 131 may request to not handle any communication sessions in step 210A for various reasons, such as, to take notes, for training, for a coffee break, for a scheduled break period, to log off for the day, and/or the like. In one embodiment, the requested break period 201 may be automatically generated.

Normally, when the contact center agent 131 makes the request to not handle any communication sessions, the contact center agent's state goes from available to auxiliary. However, in this example, the callback manager 123 determines that at least of a portion of the callback window 202A is within the requested time period 201A. Since the callback window 202A is within the requested time period 201A, the callback manager 123 determines, based on rule(s) 124, how the callback window 202A will be handled.

The callback manager 123 can automatically adjust the requested time period 201A the so that the callback window 202A is not within the time period as shown in actual time period 203A. The actual time period 203A starts after the callback window 202A at 12:20 and ends at 1:00. The actual time period 203A has been shortened to forty minutes instead of the hour that was initially requested. In one embodiment, if the actual time period 203A is shortened, the contact center agent's ending time may also be shortened (e.g., by 20 minutes) so that the contact center agent 131 does not work overtime.

The callback manager 123 may automatically adjust the requested time period 201A in different ways. For example, the callback manager 123 may automatically adjust the requested time period 201A by moving the requested time period 201A back as shown in the actual time period 203B. The requested time period 201A has been moved back from 12:00 to 1:00 to 12:20 to 1:20 in the actual time period 203B.

In one embodiment, the callback manager 123 may automatically split the actual time period 203 into two or more segments. In the actual time period 203C, the callback manager 123 has split the requested time period 201A into two segments (12:00 to 12:10 and 12:20 to 1:10) in actual time period 203C.

In one embodiment, the callback manager 123 may automatically deny 203D the requested time period 201A. In this embodiment, the contact center agent 131 cannot change the agent state from available to auxiliary to take the requested break period 201A.

In the agent schedule 200B, the contact center agent 131 is engaged in a previous call 204 from 11:30 to 12:01. The agent schedule 200B has the callback window 202B (from 11:59 to 12:09), the callback window 202C (from 12:09 to 12:19), and the callback window 202D (from 12:58 to 1:08). The contact center agent 131 has requested, right after finishing the previous call 204, the requested time period 201B (from 12:01 to 1:01) in step 210B. When the contact center agent 131 requests the time period 201B, there are multiple callback windows 202B-202D that are either wholly or partially within the requested time period 201B. For example, the callback windows 202B (11:59-12:09) and 202D (12:58 to 1:08) are both partially within the requested time period 201B. The callback window 202C is wholly within the requested time period 201B.

The callback manager 123 may automatically adjust the requested time period 201B to the actual time period 203E so that none of the callback windows 202B-202D are within the actual time period 203E. In this example, the actual time period 203E is from 12:19 to 12:58. Based on the shortened actual time period 203E, the contact center agent's ending time may also be shortened.

Callback manager 123, may automatically and/or based on user input/rules 124 may move the actual time period 203F (from 12:19 to 1:19). In this example, one of the callback windows 202D is still within the actual time period 203B. The callback manager 123 may send a message to the customer 102 that is associated with the callback window 202D to try and reschedule the callback window 202D. Alternatively, the callback window 202D may be automatically or manually associated with a different contact center agent 131. The callback manager 123 may determine that the callback window 202D is less important and can therefore be handled by a different contact center agent 131.

In one embodiment, the callback manager 123 may automatically deny 203G the requested time period 201B. In this example, the contact center agent 131 will have to handle communication sessions associated with the callback windows 202B-202D. The callback manager 123 may deny the requested time period and automatically reschedule the requested time period 201B. For example, based in rules 124, if the requested time period 201B is for a training session, the callback manager 123 may determine that there is another training session that does not have a scheduled callback window 202 and automatically schedule the contact center agent 131 in the other training session.

Figure 3:
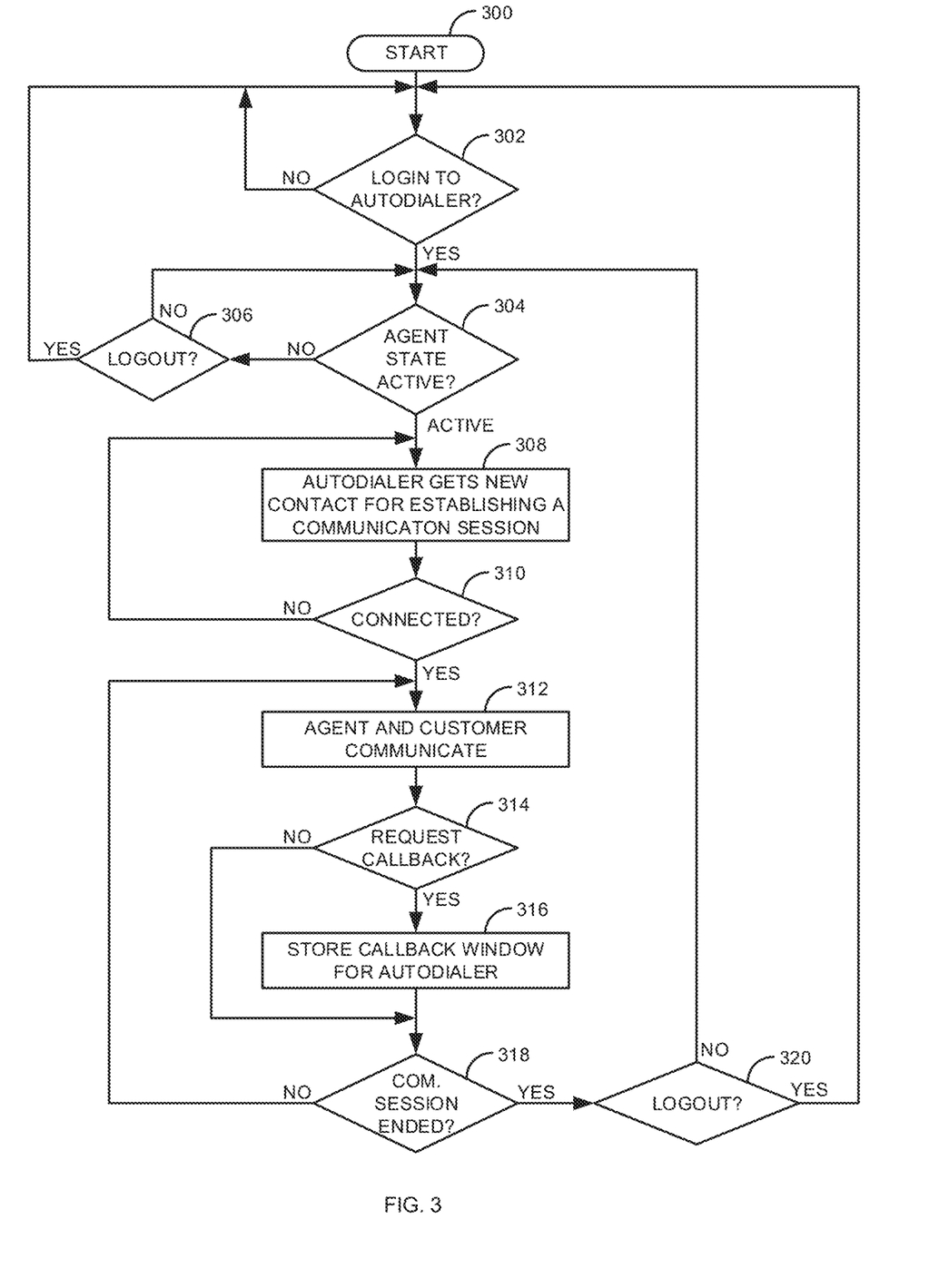
FIG. 3 is a flow diagram of a process for scheduling a callback window in a contact center.

FIG. 3 is a flow diagram of a process for scheduling a callback window 202 in a contact center 120. The process starts in step 300. The callback manager 123 determines, in step 302, if the contact center agent 131 has logged into the autodialer 122. If the contact center agent 131 has not logged into the autodialer 122 in step 302, the process of step 302 repeats. If the contact center agent 131 has logged into the autodialer 122 in step 302, the callback manager 123 determines, in step 304, if the agent state has become active (so that the agent communication endpoint 130 may receive communication sessions from the autodialer 122) in step 304. If the agent state is not active in step 304, the callback manager 123 determines, in step 306, if the contact center agent 131 has logged out of the autodialer 122. If the contact center agent 131 has logged out of the autodialer 122 in step 306, the process goes back to step 302. Otherwise, if the contact center agent 131 has not logged out of the autodialer 122 in step 306, the process goes back to step 304.

If the agent state is now active (i.e., where the agent communication endpoint 130 can now receive communication sessions from the autodialer 122) in step 304, the autodialer 122 gets a new contact (e.g., a customer 102) for establishing a communication session in step 308. The type of communication session initiated by the autodialer 122 may be any type of real-time electronic communication session, such as, voice, video, virtual reality, Instant Messaging (e.g., a chat session), and/or the like. For example, the contact center 120 may have a list of potential customers 102 (e.g., the customer's telephone numbers) that are used by the autodialer 122 to initiate a voice communication a communication session to the customer communication endpoint 101. The autodialer 122 may initiate the voice communication session by presenting a preview window to the contact center agent 131. The contact center agent 131 can then click on a call button to have the autodialer 122 automatically initiate the voice communication session to a customer communication endpoint 101.

If the communication session is not connected in step 310 (e.g., the customer 102 does not answer), the process goes back to step 308 to get a new contact. Otherwise, if the communication session is connected in step 310, the contact center agent 131 and the customer 102 communicate in step 312. For example, the customer 102 and the contact center agent 131 communicate in an Instant Messaging (IM) communication session in regard to a product supported by the contact center 120.

During the communication session, either the customer 102 and/or the contact center agent 131 may request a callback. For example, if the contact center agent 131 needs to do some research to answer the customer's question, the contact center agent 131 may request a callback with the customer 102. If a callback is requested in step 314, the callback manager 123 stores a callback window 202 for the autodialer 122 in step 316 and the process goes to step 318. Otherwise, if there is no request for a callback in step 314 or the callback manager 123 stored the callback window 202 for the autodialer 122, the communication manager 121 determines if the communication session has ended in step 318.

If the communication session has not ended in step 318, the process goes back to step 312. Otherwise, if the communication session has ended in step 318, the callback manager 123 determines, in step 320, if the contact center agent 131 has logged out of the autodialer 122. If the contact center agent 131 has logged out of the autodialer 122 in step 320, the process goes to step 302. If the contact center agent 131 has not logged out of the autodialer 122, in step 320, the process goes to step 304 to determine if the contact center agent's state is active.

Figure 4:
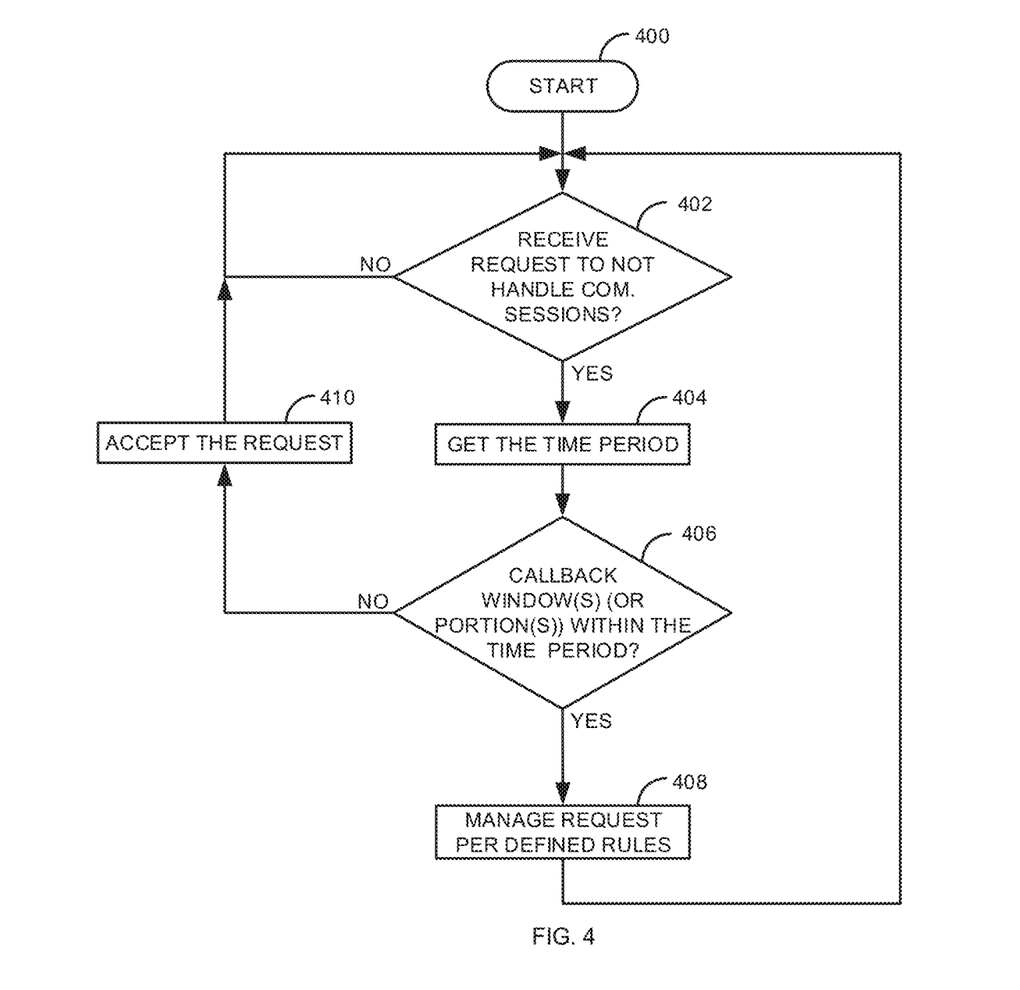
FIG. 4 is a flow diagram of a process for determining if a callback window is within a requested time period that a contact center agent is requesting to be unavailable.

FIG. 4 is a flow diagram of a process for determining if a callback window 202 is within a requested time period 201 that a contact center agent 131 is requesting to be unavailable. The process starts in step 400. The callback manager 123 determines, in step 402, if the contact center agent 131 has requested a time period 201 where the agent communication endpoint 130 will not handle communication sessions. For example, the contact center agent 131 has made a request to take a one hour break for a training session by indicating that the contact center agent's state will be inactive for the requested hour. If a request is not received in step 402, the process of step 402 repeats.

Otherwise, if the contact center agent 131 has made a request to not handle communication sessions in step 402, the callback manager 123 gets the requested time period 201 (one hour in this example) in step 404. The callback manager 123 determines, in step 406, if there is a callback window(s) 202 (or portion(s) of callback window(s) 202) within the requested time period 201. For example, as shown in FIG. 2, the callback windows 202B-202D (all or portions) are within the requested time period 201B. If the callback window(s)/portion(s) 202 are not within the requested time period 201 in step 406, the callback manager 123 accepts the requested time period 201, in step 410, and the process goes back to step 402. Otherwise, if the callback window(s)/portion(s) 202 are within the requested time period 201 in step 406, the callback manager 123 manages the request per the defined rule(s) 124 in step 408. The process then goes back to step 402.

Figure 5:
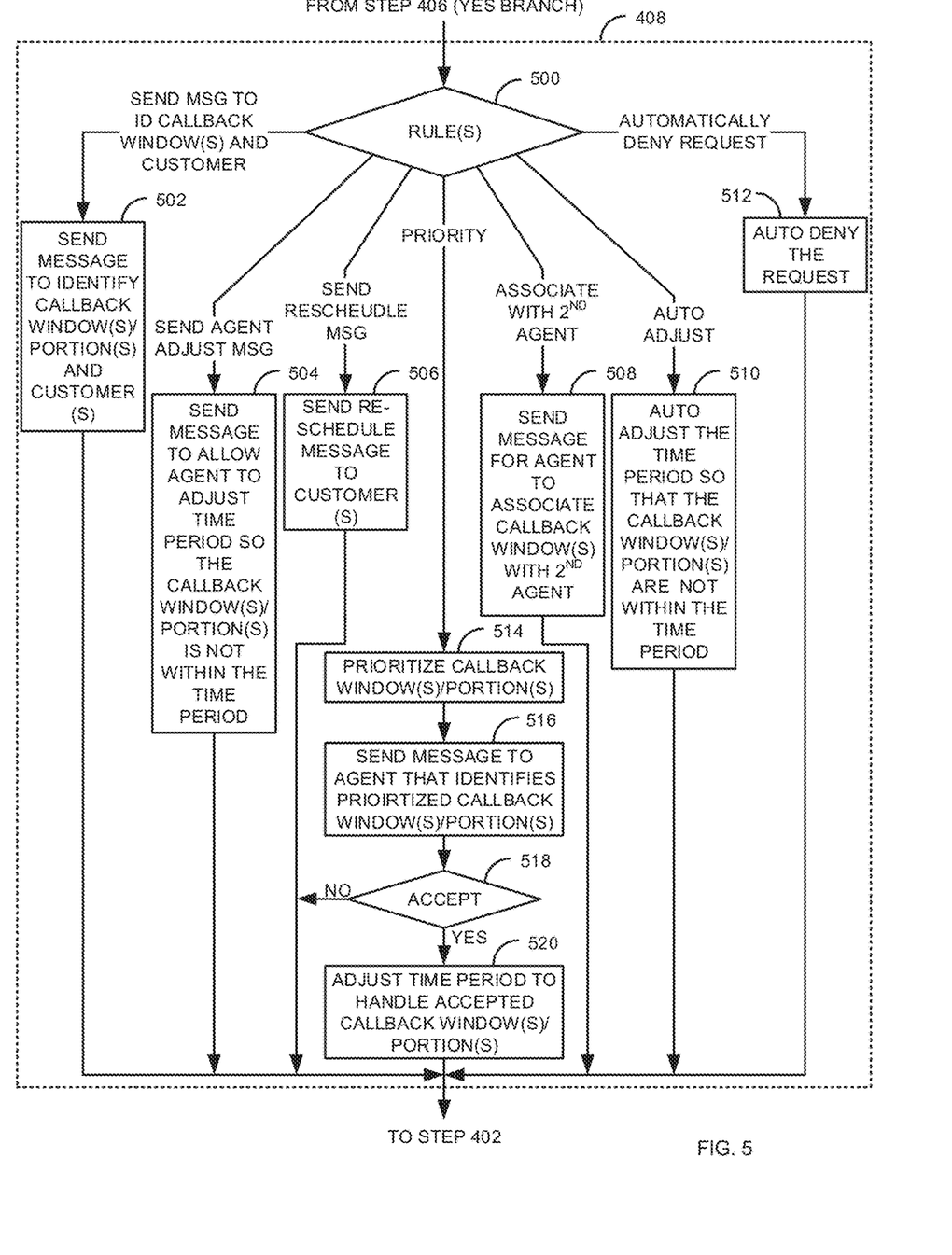
FIG. 5 is a flow diagram of a process for determining how to handle a callback if a callback window is within a requested time period that a contact center agent is requesting to be unavailable.

FIG. 5 is a flow diagram of a process for determining how to handle a callback if a callback window(s) 202 is within a requested time period 201 that a contact center agent 131 is requesting to be unavailable. FIG. 5 is an exemplary embodiment of step 408 of FIG. 4.

After determining that the callback window(s)/portion(s) 202 are within the requested time period 201 in step 406, the callback manager 123 determines, in step 500, what rule(s) 124 are to be applied to the requested time period 201. The callback manager 123 determines, in step 500, if the rule(s) 124 requires sending a message to the agent communication endpoint 130 to identify the callback window(s)/portion(s) 202 (e.g., the time period for the callback window(s) 202) and customer(s) 102 associated with the callback window(s)/portion(s) 202. If the rule(s) 124 requires sending the message that identifies that callback window(s)/portions and customer(s) 102, the message is sent in step 502 and the process goes to step 402. The message of step 502 allows the contact center agent 131 to determine if the contact center agent 131 wants to adjust, change, or cancel, the requested time period 201.

The callback manager 123 determines, in step 500, if the rule(s) 124 require sending a message to the agent communication endpoint 130 to allow the contact center agent 131 to adjust the requested time period 201 so the callback window(s)/portion(s) 202 are not within the requested time period 201. If the rule(s) 124 require sending the message to the agent communication endpoint 130 to allow the contact center agent 131 to adjust the requested time period 201 so that the callback window(s)/portion(s) 202 are not within the requested time period 201, the message is sent in step 504 and the process goes to step 402. The message of step 504 allows the contact center agent 131 to adjust the requested time period 201 so none or only some of the callback window(s)/portion(s) 202 are not within the requested time period 201.

The callback manager 123 determines, in step 500, if the rule(s) 124 require sending a message to the customer communication endpoint(s) 130 to reschedule the callback window(s) 202 of the customers 102. If the rule(s) 124 require the sending of the message (e.g., using an IVR system or text message) to the customer communication endpoint(s) 130 to reschedule the callback window(s) 202, the message is sent in step 506 and the process goes to step 402. The message of step 506 allows the contact center agent 131 to reschedule the callback windows 202.

The callback manager 123 determines, in step 500, if the rule(s) 124 require sending a message to the agent communication endpoint 130 that allows the contact center agent 131 to associate the callback window 202 with a second contact center agent 131. If the rule(s) 124 require sending the message to the agent communication endpoint 130 that allows the contact center agent 131 to associate the callback window 202 with the second contact center agent 131 (or group of contact center agents 131), the message is sent in step 508 and the process goes to step 402. The message of step 508 allows another contact center agent 131 to handle the callback window 202.

The callback manager 123 determines, in step 500, if the rule(s) 124 require the callback manager 123 to automatically adjust the requested time period 201 so that the callback window(s)/portion(s) 202 are not within the requested time period 201 in step 510. For example, as shown in FIG. 2, the callback manager 123 may automatically adjust the requested time periods 201A-201B as shown in the actual time periods 203A, 203B, 203C, 203E, and 203F of FIG. 2. In addition (though not shown), the callback manager may also send a message to the agent communication endpoint 130 that the requested time period 201 has been automatically adjusted along with an explanation as to the reason the requested time period 201 has been adjusted.

The callback manager 123 determines, in step 500, if the rule(s) 124 require the callback manager 123 to automatically deny the requested time period 201 (e.g., as described in FIG. 2). If the rule(s) 124 require the callback manager 123 to automatically deny the requested time period 201, the callback manager 123 automatically denies the requested time period 201 in step 512 and the process goes to step 402. For example, the customer 102 may be a high priority customer 102 and the rule(s) 124 may require that the callback manager 123 deny the request because of the priority of the customer 102. In addition (though not shown), the callback manager may also send a message to the agent communication endpoint 130 that the requested time period 201 has been automatically denied along with an explanation as to the reason why the requested time period 201 has been denied.

The callback manager 123 determines, in step 500, if the rule(s) 124 include determining a priority to the callback window(s)/portion(s) 202. If priority is to be used in step 500, the callback manger 123 prioritizes the callback window(s)/portion(s) 202 in step 514. For example, if the callback window 202C is for a high priority customer 102 and the callback windows 202B/202D are for low priority customers 102, the callback manager 123 can prioritize to callback windows 202B-202D as (highest priority first): 1) 202C, 2) 202B (because it is closest in time), and 3) 202D.

In one embodiment, a portion of a callback window 202 may be used to help establish priority. For example, if there was only a single callback window 202D where only a portion is within the requested time period 201B, the callback manager 123 may allow the requested time period 201B (i.e., in step 410) because the contact center agent 131 can take the callback for the callback window 202D after the requested time period 201B expires. The callback manager 123 sends a message to the contact center agent 131 that identifies the prioritized callback window(s)/portions 202 in step 516.

The contact center agent 131 can accept (will handle the callback window(s) 202) one or more of the prioritized callback window(s)/portion(s) 202 in step 518. If the contact center agent 131 does not accept any of the callback window(s)/portion(s) 202 in step 518, the process goes to step 402. Otherwise, if the contact center agent 131 accepts one or more of the prioritized callback window(s)/portion(s) 202 in step 518, the callback manager 123 (automatically) or contact center agent 131 can adjust the requested time period 201 to handle the accepted callback window(s)/portion(s) 202 based on the priority in step 520. The process then goes to step 402.

Although not shown in FIG. 5, additional rule(s) 124 may be used to define different ways that a requested time period 201 may be handled when there are one or more callback window(s)/portion(s) 202 in the requested time period 201.

Although the rule(s) 124 are shown as being implemented in parallel in step 500, one of skill in the art would recognize that various combinations of steps 502-520 may be implemented. For example, based on the rule(s) 124, for a callback window 202, the callback manager 123 may deny the request in step 512 and send the message of step 504. One of skill in the art would also recognize that the rule(s) 500 may be implemented is series as well.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network 110, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An automated callback system comprising:
one or more processors; and
a computer readable medium, coupled with the one or more processors and comprising processor readable and executable instructions that, when executed by the one or more processors, cause the one or more processors to:
receive a plurality of callback windows for initiating a plurality of electronic communication sessions with a plurality of customer communication endpoints;
receive a request, from an agent communication endpoint, to not handle any electronic communication sessions during a time period;
determine that at least a portion of at least two of the plurality of callback windows are within the time period; and
in response to determining that the at least a portion of the at least two of the plurality of callback windows are within the time period, implement at least one of the following actions:
automatically denying the request for the agent communication endpoint to not handle any electronic communication sessions during the time period;
automatically adjusting the time period so that the at least a portion of the at least two of the plurality of callback windows are not within the time period;
sending a first message to the agent communication endpoint that allows a first contact center agent to adjust the time period so that the at least a portion of the at least two of the plurality of callback windows are not within the time period;

sending a second message to the agent communication endpoint that identifies the at least a portion of the at least two of the callback windows and at least two customers associated with the at least two of the callback windows;

sending a third message to the agent communication endpoint that allows the first contact center agent to associate one or more of the at least two callback widows with a second contact center agent; and sending a fourth message to the agent communication endpoint that prioritizes the at least a portion of the at least two of the plurality of callback windows.

2. The automated callback system of claim 1, wherein the implemented at least one action comprises sending the fourth message to the agent communication endpoint that prioritizes the at least a portion of the at least two of the plurality of callback windows.

3. The automated callback system of claim 2, wherein the fourth message that identifies the prioritized at least a portion of at least two of the plurality of callback windows allows the first contact center agent to accept or reject at least one of the prioritized at least a portion of the at least two of the plurality of callback windows.

4. The automated callback system of claim 3, wherein accepting the at least one of the prioritized at least a portion of the at least two of the plurality of callback windows implements an action to automatically adjust the time period so that the accepted at least one of the prioritized at least a portion of the at least two of the plurality of callback windows is not within the time period.

5. The automated callback system of claim 1, wherein automatically adjusting the time period so that the at least a portion of the at least two of the plurality of callback windows are not within the time period comprises automatically shortening the time period.

6. The automated callback system of claim 1, wherein automatically adjusting the time period so that the at least a portion of the at least two of the plurality of callback windows are not within the time period comprises automatically moving the time period back.

7. The automated callback system of claim 1, wherein the instructions further cause the one or more processors to send a fifth message to one of the plurality of customer communication endpoints to reschedule one of the callback windows.

8. A method comprising:

receiving, with one or more processors, a plurality of callback windows for initiating a plurality of electronic communication sessions with a plurality of customer communication endpoints;

receiving, with the one or more processor, a request, from an agent communication endpoint, to not handle any electronic communication sessions during a time period;

determining, with the one or more processor, that at least a portion of at least two of the plurality of callback windows are within the time period; and in response to determining that the at least a portion of the at least two of the plurality of callback windows are within the time period, implementing, with the one or more processors, at least one of the following actions:

automatically denying the request for the agent communication endpoint to not handle any electronic communication sessions during the time period;

automatically adjusting the time period so that the at least a portion of the at least two of the plurality of callback windows are not within the time period;

sending a first message to the agent communication endpoint that allows a first contact center agent to adjust the time period so that the at least a portion of the at least two of the plurality of callback windows are not within the time period;

sending a second message to the agent communication endpoint that identifies the at least a portion of the at least two of the callback windows and at least two customers associated with the at least two of the callback windows;

sending a third message to the agent communication endpoint that allows the first contact center agent to associate one or more of the at least two callback widows with a second contact center agent; and sending a fourth message to the agent communication endpoint that prioritizes the at least a portion of the at least two of the plurality of callback windows.

9. The method of claim 8, wherein the implemented at least one action comprises sending the fourth message to the agent communication endpoint that prioritizes the at least a portion of the at least two of the plurality of callback windows.

10. The method of claim 9, wherein the fourth message that identifies the prioritized at least a portion of at least two of the plurality of callback windows allows the first contact center agent to accept or reject at least one of the prioritized at least a portion of the at least two of the plurality of callback windows.

11. The method of claim 10, wherein accepting the at least one of the prioritized at least a portion of the at least two of the plurality of callback windows implements an action to automatically adjust the time period so that the accepted at least one of the prioritized at least a portion of the at least two of the plurality of callback windows is not within the time period.

12. The method of claim 8, wherein automatically adjusting the time period so that the at least a portion of the at least two of the plurality of callback windows are not within the time period comprises automatically shortening the time period.

13. The method of claim 8, wherein automatically adjusting the time period so that the at least a portion of the at least two of the plurality of callback windows are not within the time period comprises automatically moving the time period back.

14. The method of claim 8, further comprising sending, with the one or more processors, a fifth message to one of the plurality of customer communication endpoints to reschedule one of the callback windows.

15. A computer program product comprising:

a non-transitory computer-readable storage medium having computer-readable program code embodied therewith, the computer-readable program code configured, when executed by one or more processors, to:

receive a plurality of callback windows for initiating a plurality of electronic communication sessions with a plurality of customer communication endpoints;

receive a request, from an agent communication endpoint, to not handle any electronic communication sessions during a time period;

determine that at least a portion of at least two of the plurality of callback windows are within the time period; and in response to determining that the at least a portion of the at least two of the plurality of callback windows are within the time period, implement at least one of the following actions:
  automatically denying the request for the agent communication endpoint to not handle any electronic communication sessions during the time period;
  automatically adjusting the time period so that the at least a portion of the at least two of the plurality of callback windows are not within the time period;
  sending a first message to the agent communication endpoint that allows a first contact center agent to adjust the time period so that the at least a portion of the at least two of the plurality of callback windows are not within the time period;
  sending a second message to the agent communication endpoint that identifies the at least a portion of the at least two of the callback windows and at least two customers associated with the at least two of the callback windows;
  sending a third message to the agent communication endpoint that allows the first contact center agent to associate one or more of the at least two callback widows with a second contact center agent; and
  sending a fourth message to the agent communication endpoint that prioritizes the at least a portion of the at least two of the plurality of callback windows.

16. The automated callback system of claim 15, wherein the implemented at least one action comprises sending the fourth message to the agent communication endpoint that prioritizes the at least a portion of the at least two of the plurality of callback windows.

17. The automated callback system of claim 16, wherein the fourth message that identifies the prioritized at least a portion of at least two of the plurality of callback windows allows the first contact center agent to accept or reject at least one of the prioritized at least a portion of the at least two of the plurality of callback windows.

18. The automated callback system of claim 17, wherein accepting the at least one of the prioritized at least a portion of the at least two of the plurality of callback windows implements an action to automatically adjust the time period so that the accepted at least one of the prioritized at least a portion of the at least two of the plurality of callback windows is not within the time period.

19. The automated callback system of claim 15, wherein automatically adjusting the time period so that the at least a portion of the at least two of the plurality of callback windows are not within the time period comprises automatically shortening the time period.

20. The automated callback system of claim 15, wherein automatically adjusting the time period so that the at least a portion of the at least two of the plurality of callback windows are not within the time period comprises automatically moving the time period back.

* * * * *